US010272927B2

(12) United States Patent
Mahnke et al.

(10) Patent No.: US 10,272,927 B2
(45) Date of Patent: Apr. 30, 2019

(54) SENSOR DATA NETWORK

(71) Applicant: NXP B.V.

(72) Inventors: Holger Mahnke, Hohenwestedt (DE);
Abdellatif Zanati, Hamburg (DE);
Michael Johannes Doescher, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/842,253

(22) Filed: Dec. 14, 2017

(65) Prior Publication Data

US 2018/0170400 A1 Jun. 21, 2018

(30) Foreign Application Priority Data

Dec. 20, 2016 (EP) .................................... 16205551

(51) Int. Cl.
*B60W 50/14* (2012.01)
*G07C 5/00* (2006.01)
*G08G 1/00* (2006.01)
*G08G 1/017* (2006.01)
*G01S 17/93* (2006.01)
*G01S 7/00* (2006.01)
*G01S 13/87* (2006.01)
(Continued)

(52) U.S. Cl.
CPC ............ *B60W 50/14* (2013.01); *G01S 7/003* (2013.01); *G01S 13/878* (2013.01); *G01S 13/931* (2013.01); *G01S 17/936* (2013.01); *G07C 5/008* (2013.01); *G08G 1/017* (2013.01); *G08G 1/22* (2013.01); *B60W 2050/143* (2013.01); *G01S 7/40* (2013.01); *G01S 7/497* (2013.01); *G01S 13/86* (2013.01); *G01S 2013/936* (2013.01); *G01S 2013/9353* (2013.01);
(Continued)

(58) Field of Classification Search
CPC ...... B60W 50/14; G01S 7/003; G01S 13/878; G01C 5/08; G08G 1/017; G08G 1/22
USPC .......................................... 701/30.8
See application file for complete search history.

(56) References Cited

U.S. PATENT DOCUMENTS 7,421,334 B2 * 9/2008 Dahlgren ............... G07C 5/008
340/989
7,940,206 B2  5/2011 Nohara et al.
(Continued)

FOREIGN PATENT DOCUMENTS

DE         198 44 239 C1    7/2000
DE    10 2010 0423 61 A1    4/2012
(Continued)

*Primary Examiner* — Tan Q Nguyen
(74) *Attorney, Agent, or Firm* — Rajeev Madnawat

(57) ABSTRACT

An apparatus includes a processor configured to receive first sensor data from a sensor system of the first entity and a receiver. The receiver is configured to receive second sensor data from a second entity in the vehicle to vehicle network over a communication network and provide the second sensor data to the processor. The second sensor data comprises a first type of sensor data having a first bandwidth requirement. The processor is further configured to determine an available bandwidth of the communication system; and when the first bandwidth requirement exceeds the communication bandwidth, select a second type of sensor data having a second bandwidth requirement. The second bandwidth requirement is less than the first bandwidth requirement. The processor is further configured to process the first and second sensor data to at least partially determine an environment surrounding the first entity.

15 Claims, 5 Drawing Sheets

(51) Int. Cl.
    *G01S 13/93*              (2006.01)
    *G07B 15/06*              (2011.01)
    *H04B 7/26*               (2006.01)
    *G01S 7/40*               (2006.01)
    *G01S 7/497*              (2006.01)
    *G01S 13/86*              (2006.01)

(52) U.S. Cl.
    CPC .... *G01S 2013/9367* (2013.01); *G07B 15/063* (2013.01); *H04B 7/26* (2013.01)

(56) References Cited

U.S. PATENT DOCUMENTS

| | | | |
|---|---|---|---|
| 9,036,509 B1* | 5/2015 | Addepalli | H04W 4/046 370/259 |
| 9,103,671 B1 | 8/2015 | Breed et al. | |
| 9,113,417 B2 | 8/2015 | Lee et al. | |
| 2002/0198632 A1* | 12/2002 | Breed | B60N 2/2863 701/1 |
| 2012/0109446 A1* | 5/2012 | Yousefi | H04N 7/183 701/29.3 |
| 2014/0195072 A1 | 7/2014 | Graumann | |
| 2014/0309839 A1* | 10/2014 | Ricci | H04W 4/21 701/25 |
| 2016/0189544 A1* | 6/2016 | Ricci | G07C 5/008 701/117 |

FOREIGN PATENT DOCUMENTS

| | | |
|---|---|---|
| EP | 2 385 508 A2 | 11/2011 |
| KR | 10-0813909 B1 | 3/2008 |
| KR | 10-1338554 B1 | 12/2013 |
| WO | 01/50435 A1 | 7/2001 |

* cited by examiner

SENSOR DATA NETWORK

CROSS-REFERENCE TO RELATED APPLICATIONS

This application claims the priority under 35 U.S.C. § 119 of European Patent application no. 16205551.1, filed on Dec. 20, 2016, the contents of which are incorporated by reference herein.

FIELD

Embodiments of the present application relate to environment sensing in vehicles and in particular but not exclusively to the sensor data of such environmental sensing.

BACKGROUND

Radar-, vision- or lidar-sensing in automotive applications is playing an increasing role in the technology development towards a self-driving vehicle and can be used for the control of vehicle safety features such as, for example, automatic emergency breaking.

Radar uses electromagnetic waves to determine the distance, position, size and velocity of objects in the environment surrounding a vehicle. Vision-sensing is based on the use of live images and image processing to determine the environment surrounding the vehicle. Lidar (Light Detection and Ranging) sensing determines the surrounding environment based on the reflection of light, for example ultraviolet or near-infrared light.

For these sensing methods, one or more sensors may be situated around a vehicle to sense the environment and produce sensor data to be processed. There is an advantage in sensing accuracy and range when multiple sensors are implemented, however the number of sensors increases the cost of the system.

Embodiments aim to provide sufficient sensor information to improve the accuracy of a determination of an environment surrounding a vehicle.

SUMMARY

According to a first aspect of the present application, there is provided an apparatus forming part of a first entity in a vehicle to vehicle network, the apparatus comprising: a processor configured to receive first sensor data from a sensor system of the first entity; and a receiver configured to: receive second sensor data from a second entity in the vehicle to vehicle network over a communication network; and provide the second sensor data to the processor, wherein the second sensor data comprises a first type of sensor data having a first bandwidth requirement; wherein the processor is further configured to: determine an available bandwidth of the communication system; when the first bandwidth requirement exceeds the communication bandwidth, select a second type of sensor data having a second bandwidth requirement, where the second bandwidth requirement is less than the first bandwidth requirement; and process the first and second sensor data to at least partially determine an environment surrounding the first entity.

The second sensor data may correspond to sensor data of a sensory system of the second entity. The processor may be further configured to carry out an error check on the received second sensor data. The determination of the available bandwidth may be carried out in dependence on the outcome of the error check. The processor may be further configured to compare the received second sensor data to the first sensor data. The determination of the available bandwidth may be carried out in dependence on the comparison of the first and second sensor data. The apparatus may be further configured to transmit an acknowledgment to the second entity in response to receiving the second sensor data. The apparatus may be configured to receive an indication of a selection of a type of sensor data from the second entity.

According to a second aspect, there is provided a method comprising: receiving first sensor data from a sensor system of a first entity in a vehicle to vehicle network; receiving second sensor data from a sensor system of a second entity in the vehicle to vehicle network over a communication network, wherein the second sensor data comprises a first type of sensor data having a first bandwidth requirement; determining an available bandwidth of the communication system; when the first bandwidth requirement exceeds the communication bandwidth, select a second type of sensor data having a second bandwidth requirement, where the second bandwidth requirement is less than the first bandwidth requirement; and processing the first and second sensor data and the second sensor data to at least partially determine an environment surrounding the first entity.

The second sensor data may correspond to sensor data of a sensory system of the second entity. The method may further comprise: carrying out an error check on the received second sensor data. Determining the available bandwidth may be carried out in dependence on the outcome of the error check. The method may further comprise: comparing the received second sensor data to the first sensor data. Determining the available bandwidth may be carried out in dependence on the comparison of the first and second sensor data. The method may further comprise: transmitting an acknowledgment to the second entity in response to receiving the second sensor data.

The method may further comprise receiving an indication of a selection of a type of sensor data from the second entity.

According to a third aspect, there is provided an apparatus forming part of a first entity in a vehicle to vehicle network, the apparatus comprising: a processor configured to receive first sensor data from a sensor system of the first entity; and a receiver configured to receive second sensor data from a second entity in the vehicle to vehicle network and provide the second sensor data to the processor; wherein the processor is further configured to: process the first and second sensor data and the second sensor data to at least partially determine an environment surrounding the first entity.

FIGURES

Embodiments will be described, by way of example only, with reference to the drawings, in which.

It will be appreciated that for features that span more than one drawing like reference numerals indicate the like feature.

DETAILED DESCRIPTION

Vehicle sensor systems may be limited by the amount of sensor information available, for example, may be limited by the number of sensors that may be implemented on the vehicle. Embodiments of the present application are directed towards making use of sensor information from multiple vehicles. The use of sensor information from the sensors of multiple vehicle may increase the range, resolution, and accuracy of a sensor system. Sensor information may be shared between vehicles through the use of vehicle to vehicle (V2V) or vehicle to everything (V2X) communication.

Figure 1:
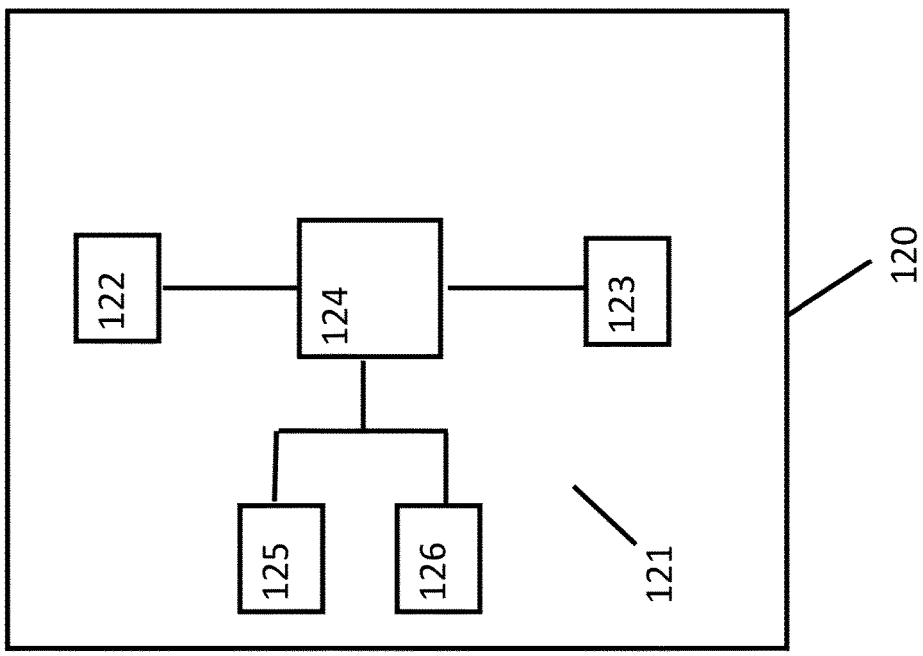
FIG. 1 is an example of entities in communication network.
Figure 1:
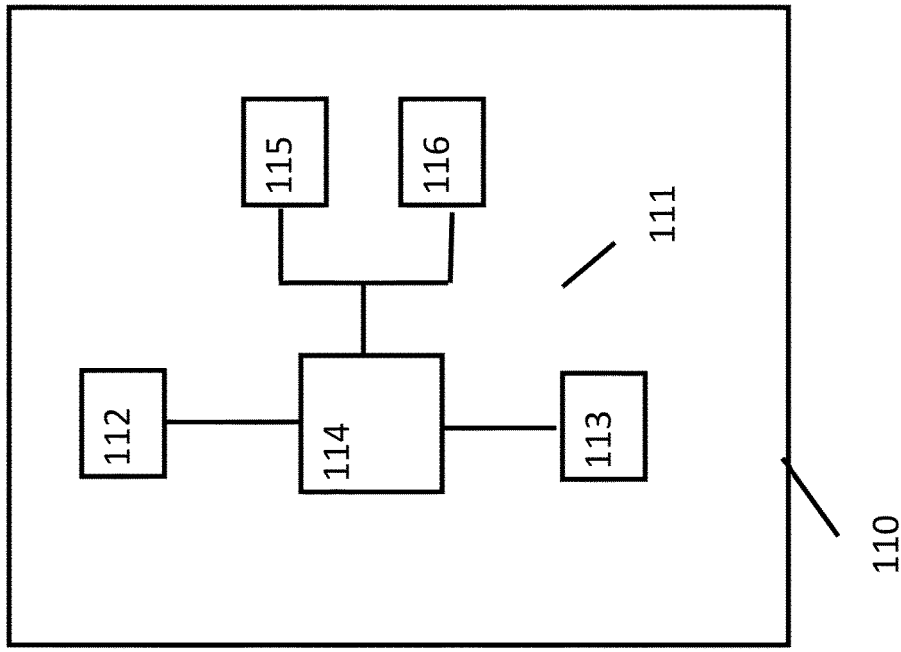

FIG. 1 shows a sensor information sharing system in accordance with an embodiment.

FIG. 1 shows a first vehicle 110 and a second vehicle 120. The first vehicle 110 comprises a first sensor system 111. The first sensor system 111 comprises a first sensor 112 and a second sensor 113 coupled to a processor 114. The processor 114 may be coupled to a sensor information transmitter 115 and sensor information receiver 116. The second vehicle 120 comprises a second sensor system 121. The second sensor system 121 comprises a first sensor 122 and a second sensor 123 coupled to a processor 124. The processor 124 may be coupled to a sensor information transmitter 125 and sensor information receiver 126.

In operation of the first vehicle 110, the first processor 114 may be configured to receive sensor information from the first sensor 112 and the second sensor 113. An indication of the sensor information may be generated and provided to the transmitter 115. The transmitter 115 may transmit the indication of the sensor information to at least one other vehicle, for example vehicle 120. The receiver 116 may be configured to receive an indication of sensor information from a further vehicle, for example the second vehicle 120. The received indication of sensor information may correspond to sensor information generated by one or more sensors of the further vehicle. The receiver 116 may provide the received indication of sensor information to the processor 114.

The processor 114 may use the sensor information from the first and second sensors 112, 113 of the first vehicle and the received indication of sensor information to determine an environment surrounding the first vehicle.

Similarly, in operation of the second vehicle 120, the first processor 124 may be configured to receive sensor information from the first sensor 122 and the second sensor 123 of the second sensor system 121. An indication of the sensor information may be generated and provided to the transmitter 125. The transmitter 125 may transmit the indication of the sensor information to a further vehicle, for example the first vehicle 110. The receiver 126 may be configured to receive the indication of sensor information from the first vehicle 110. The received indication of sensor information may correspond to sensor information generated by one or more sensors 112, 113 of the first vehicle 110. The receiver 126 may provide the received indication of sensor information to the processor 124.

The processor 124 may use the sensor information from the first and second sensors 122, 123 of the second vehicle 120 and the received indication of sensor information to determine an environment surrounding the second vehicle 120.

The sensing systems of the first and second vehicles 110 and 120 may form an ad-hoc network to share and process sensor information collectively in a peer-to-peer mode. In an example, the indications of sensor information may be shared or transmitted by means of V2X communication. In this case, the communication may be vehicle to vehicle or may be vehicle to a stationary sensing or communicating entity. In one examples, the communication method may be in accordance with IEEE 802.11p however it will be appreciated that other communication means may be used, for example LTE, 5G or a GHz radar carrier signal itself. In some case the use of 802.11p, LTE or 5G mobile phone standards may reduce interference between a radar sensing signal and the indication of sensor information carrier signals.

In the example of FIG. 1, two vehicles were shown, each generating and receiving an indication of sensor information. It will be appreciated that this is by way of example only and in other embodiments different combinations of communication may be implemented—any information exchange is not limited to only from one "sending" vehicle to one or more "receiving" vehicles. For example, multiple vehicles may send an indication of sensor information to one or more receiving vehicles. The vehicle 110 or 120 may operate simultaneously as sender, repeater and/or receiver in embodiments.

In some embodiments one or more vehicles in a network may be replaced by stationary objects having the same functionality as the first or second vehicle 110, 120. These entities may for example be positioned to monitor traffic from a central position and generating a data stream comprising an indication of sensor data which can be used by vehicles.

Figure 2:
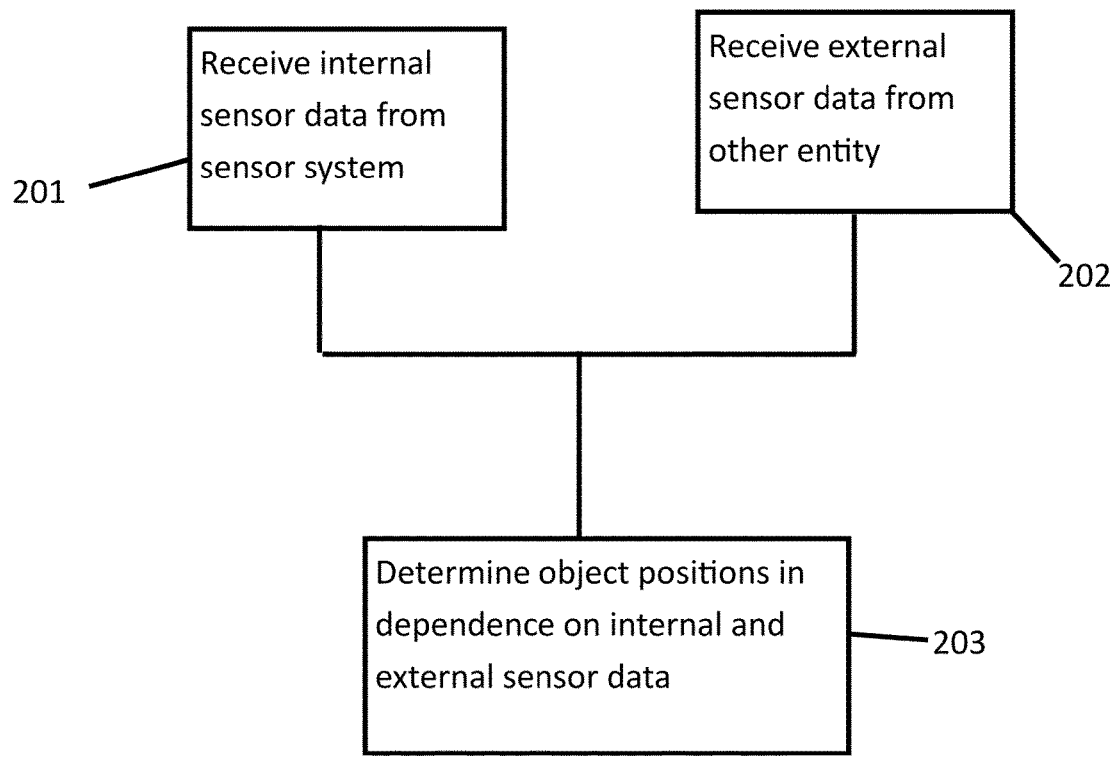
FIG. 2 is a flow diagram depicting method steps in accordance with a first embodiment.

FIG. 2 is a flow diagram that shows the method steps in accordance with an embodiment.

At step 201 internal sensor data is received. The sensor data may for example be generated by one or more sensors of a vehicle and may be provided to a processor of that vehicle, for example processor 114. At step 202 external sensor data may be received. The external sensor data may correspond to sensor data from one or more sensors of a further vehicle or entity, for example vehicle 120 and sensors 122 and 123. The external sensor data may be an indication of sensor data.

At step 203 a processor, for example processor 114, may determine or at least partially determine an environment surrounding the vehicle in dependence on the internal sensor data and the external sensor data. The external sensor data in some embodiments may further cause the processor to take an action such as direct the sensor system to a specific area in response to the external sensor data.

In the foregoing, external sensor data has been described. In some examples, the external sensor data may be an indication of sensor data from one or more sensors of a sensor system of a further vehicle or road side entity. Furthermore a vehicle has been described as generating and transmitting an indication of sensor data to a further entity.

It will be appreciated that the indication of sensor data may take a variety of forms. Three example formats of the indication of sensor data will be described.

In a first example, the indication of sensor data may be in the form of an attention byte. The attention byte may have a first, for example high, status or value and a second, for example low, status or value. If the attention byte is received with the first status, this may generate an alarm trigger in the receiving system. The first status of the attention byte may indicate that the external sensor system has detected an object or situation in the surrounding environment that the receiving system should be aware of. If the attention byte is received with the second status, this may represent that the external sensor system has detected a normal surrounding environment.

The attention byte may be generated by the sending sensor system and may indicate that an object has been detected in the path of the sending vehicle.

The attention byte in some examples may be a coded signal word. In this examples, the sent indication of sensor data is generic and may be broadcast to surrounding vehicles. In response to receiving an attention byte of the first status, the receiving vehicle or system may respond in accordance with its own programming. For example, the receiving vehicle may direct its sensor to the direction of the entity transmitting the attention byte, or carry out extra sensor data processing.

While the first status has been exemplified as high and the second status as low, it will be appreciated that these selections may be arbitrary and the attention byte may have a different value corresponding to the first and second status.

Optionally, in response to receiving an attention byte, a receiving vehicle or entity may transmit an acknowledgement to the transmitting vehicle or entity. The acknowledgement may be for example a coded signal word and be a status byte.

In a second example, the indication of sensor information may comprise more complex information. In this example, the indication of sensor information may comprise a list of objects that have been detected in the environment surrounding the sender of the indication of sensor information. In some examples, the list of detected objects may be compressed.

An example format of a compressed list of detected objects may comprise a plurality of data fields. A first data field may correspond to an object size and may contain an indication of a size of a detected object. For example, the first data field may hold a value indicating a size category such as. A—pedestrian, B—bicycle, C motorbike, D—small car, E—big car, F—lorry, G—small to large immobile object, otherwise unclassified. It will of course be appreciated that these categories are by way of example only and they may be selected to correspond to other/different objects and the values may take other forms, for example a number of bytes or a code word.

A second data field may comprise an indication of a velocity of the object with respect to the sensing vehicle. For example, this data field may have a one or two byte value with the relative velocity being in the same direction as the sensing vehicle when the value is positive and in an opposite direction when the value is negative.

A third data field may comprise an indication of the position of a detected object with respect to the sensing vehicle. For example, the position may be given in degrees such as 0 when the object is straight ahead of the path of the car and then clockwise increasing to 360° as the angle of the direction of the object with respect to the path of the vehicle changes. It will be appreciated that this is by way of example only and other types of angular measurement with other zero points may be selected.

A fourth data field may comprise and indication of an absolute velocity of the sensing car in, for example m/s. A fifth indication may for example include an absolute position of sensing car in, for example, GPS coordinates (for example degrees, minutes, seconds latitude and longitude).

An example of a detected object may be a bicycle approaching the sensing vehicle at a 1 o'clock position relative to the sending vehicle which is driving at an urban speed limit. This may appear of the object list as:

[B, −1, 30, 16, aa, bb, cc, dd, ee, ff]

Where B indicates that the detected object is a bicycle size; −1 indicates that the object is slower than the sensing vehicle; 30 indicated that the object is at a position 30 degrees from the direct forward path of the sensing vehicle; 16 indicates the absolute velocity of the car; and aa, bb, cc, dd, ee and ff may be GPS co-ordinates for the sensing vehicle which may, for example, be provided to the processor from a GPS system of the vehicle.

The condensed object list may be generated by the processor 114 or 124 in response to internal sensor data from the respective sensor systems 111 or 121. The condensed object list may then be transmitted to at least one other vehicle or entity. In one example the list may be transmitted to entities downstream of the sending entity. In this case, downstream may mean downstream in terms of the flow of traffic where downstream vehicles or entities occupy a space or area previously occupied by the sending entity.

Communication of an indication of sensor information downstream, may allow following (receiving) vehicles or entities to react to the information. For example, the receiving entity may react in accordance with a reaction mode or response as defined by the processor of the receiving entity. Examples of the reaction of the receiving entity may be beam focusing to areas of interest indicated by the indication of sensor information, resolution enhancement, alarm mode execution and/or elimination of falsely detected objects.

In this example the receiving vehicle or entity may provide a response to the indication of sensor information. The response may comprise an acknowledgement, for example similar to the acknowledgment byte in response to the attention byte. In a further example, the response may comprise a condensed object list generated by the receiving vehicle or entity. For example a first entity may generate and send a first condensed object list to a second vehicle. In response, the second vehicle may generate a second condensed object list based on sensor data of a sensor system of the second vehicle. The second vehicle may then transmit the second condensed object to the first vehicle or entity as an acknowledgment and response to the first condensed object list.

It will be appreciated that the receiving entity may or may not respond to a list of objects from a sending entity by generating and sending a list of its own. In an example, the first vehicle may generate and send a compressed list of objects to a second vehicle. The second vehicle may generate and respond to the first vehicle with a compressed list of objects. The first vehicle may be upstream with respect to the second vehicle. In examples where the first, upstream, vehicle receives a compressed list of objects from the second, downstream, vehicle, the first vehicle may use the downstream information to carry out a backwards comparison of the first vehicle's data (for example, the sent indication of sensor data). This may allow the first vehicle to carry out or execute routines for various system checks, for example for calibration and/or system failure detection.

In a third example, the indication of sensor data may comprise raw sensor data. In this case, a sending vehicle or entity may transmit raw sensor data to further entities or vehicles. The receiving vehicles or entities may use or process the raw sensor data with sensor data from their own sensor systems to provide enhanced determination of the surrounding environment. The availability of additional sensor data may allow enhanced resolution and/or range in some examples. In other examples, the availability of additional sensor data may lead to reduced requirements of an internal sensor system of a vehicle or entity as additional sensor data is available externally to the sensor system.

For examples, high resolution radars may be used in long range sensing. High angular resolution is proportional to the number of the radar channels; "m" transmitters and "n" receivers. The angular resolution is proportional to the number of transmitters and receivers m×n. A high resolution may be used to solve traffic scenarios where, for example, two or more vehicles have a similar velocity and a similar position and/or are otherwise closely spaced. A low resolution radar may only detect a single large target instead of the said two or more targets.

In a system where an indication or sensor data is transmitted by one or more vehicles or entities, the additional sensor information may be used by internal sensor systems of the vehicles or entities. In this example, the additional sensor information may support the use of an otherwise insufficient low resolution radar by correlating a single target using a communicated position and velocity of different vehicles in the system. The enablement of the use of low resolution radar for medium to long range may allow fewer channels and lower gain antennas (internal radar system may require less space). Computation power may also be proportionally reduced.

In systems where the indication of sensor data corresponds to raw sensor data, the receiving vehicle or entity may generate and provide raw sensor data in response. In this case, the vehicles or entities may for example form a peer network of shared sensor data. As discussed in relation to the indication of sensor data comprising a compressed list of objects, responses by downstream vehicles or entities may equip an upstream or sending vehicle or entity to carry out or execute routines for various system checks, for example for calibration and/or system failure detection.

Sharing sensor information may lead to a reduced requirement to generate internal sensor data for individual vehicles. A reduction in sensors capabilities in individual sensor systems may allow a reduction of power consumption in individual-vehicles or entities by, for example, reducing the output power of a radar or by reducing the duty cycle, for example, switching it off in case of sufficient data coverage provided by other vehicles. In some case, this may affect lifetime reliability and result in lower requirements on board or housing materials, such as active or passive coolant systems etc.

Figure 3:
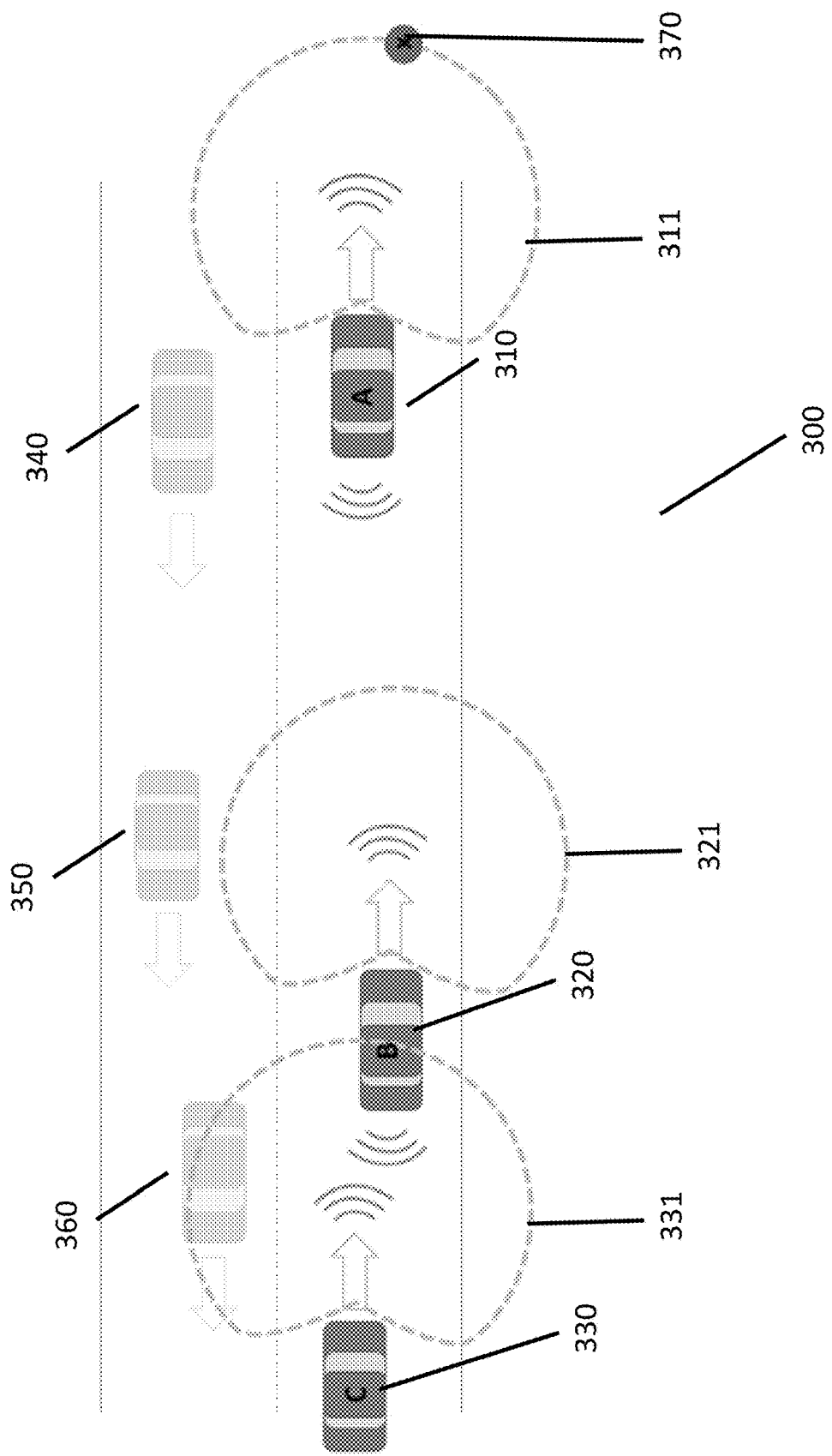
FIG. 3 is an example of a vehicle to vehicle network in accordance with a second embodiment.
Figure 4:
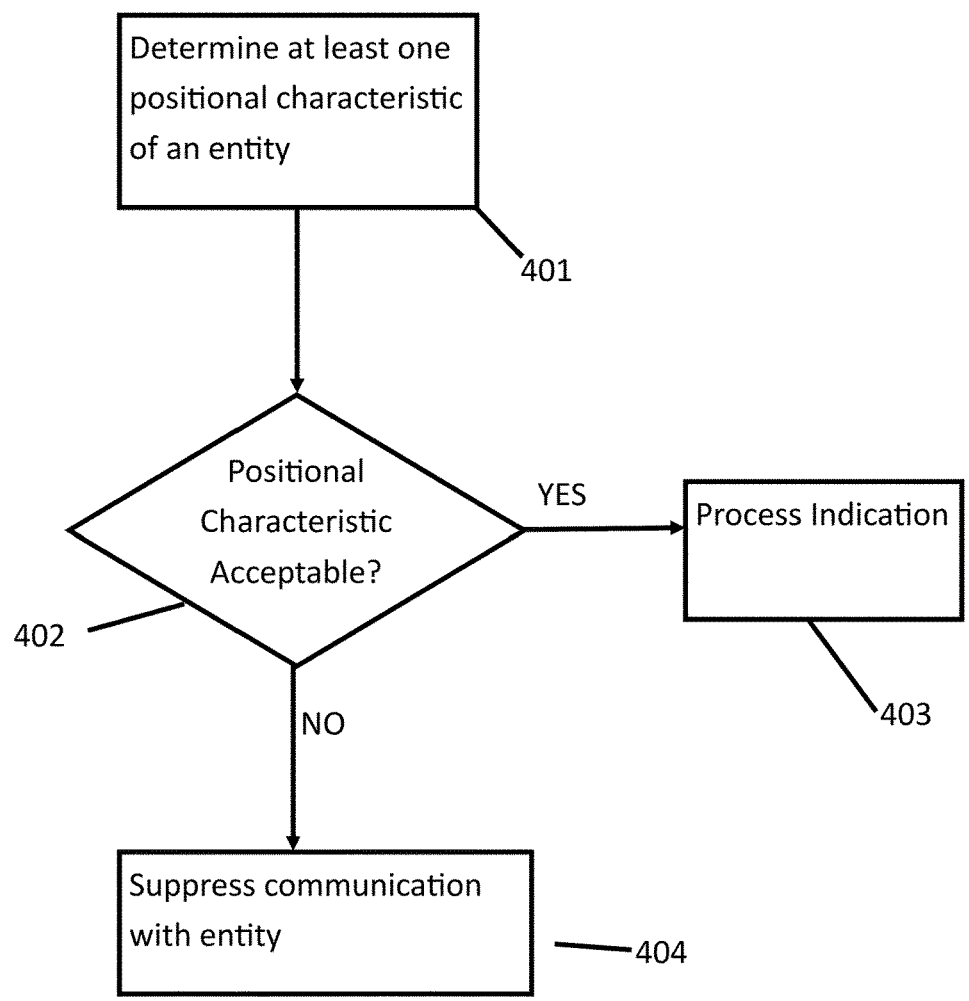
FIG. 4 is a flow diagram depicting the method steps in accordance with the second embodiment.

While the uni or bidirectional exchange of an indication of sensor data has been described, it will be appreciated that that exchange may take place over a communication network between two or more vehicles or entities. In examples, the communication network may be a vehicle to vehicle (V2V) or vehicle to everything (V2X) communication network where communication takes place using a relevant communication standard, for example IEEE 802.11p, or LTE or 5G. A sending or receiving vehicle or entity may, in practice, have a plurality of other vehicles or entities to communicate with. The performance of the communication may be impacted by the number of communication partners for example due to the communication speed or a latency experienced by the communication. FIGS. 3 and 4 describe an embodiment in which a vehicle may selectively transmit and/or receive indications of sensor data.

FIG. 3 shows a vehicle to vehicle (V2V) network 300 comprises a first vehicle 310, second vehicle 320 and third vehicle 330 travelling in a first direction and following a common path. The network 300 further comprises a fourth vehicle 340, fifth vehicle 350 and sixth vehicle 360 travelling in a second direction and following a common path. It will be appreciated that one or more of the vehicles may be in accordance to the vehicles 110 or 120 as described in relation to FIG. 1. At least some of the first to sixth vehicles may in close enough proximity to each other to communicate in the V2V network.

Focusing now on the first 310, second 320 and third 330 vehicles travelling in the first direction along the common path, each of the first, second and third vehicles may be equipped with a respective sensor system, for example sensor systems 111 or 121. Each of the sensor systems, may have a detection range. In FIG. 3, the sensor system of the first vehicle 310 has a first range 311, the sensor system of the second vehicle 320 has a second range 321 and the sensor system of the third vehicle 330 has a third range 331.

The sensor system of the first vehicle 311 may detect a first object 370 and may generate an indication of sensor data to be transmitted to one or more other vehicles within range. The first vehicle 310 may transmit the indication of sensor information. In this example, the detection of the object 370 may be relevant information for the second 320 and third 330 vehicle as they are travelling in the same direction along the common path. The detection of the object 370 may not, in this example, be relevant information for the fourth 340, fifth 350 and sixth vehicles 360 as they are unlikely to come into proximity with the detected object.

Each of the fourth 340, fifth 350 and sixth vehicles 360 travelling in the second direction as well as the second vehicle 320 may transmit indications of sensor data. The third vehicle 330 may therefore be in a position to receive indications of sensor data from five surrounding vehicles in this example. In some cases, a large number of indications of sensor data available to be received at a vehicle or entity may adversely affect the ability of the vehicle or entity to process the indications of sensor data in a timely manner.

In embodiments, an indication of sensor data may be sent as a broadcast message or in a broadcast format, namely that this information is available to all the surrounding receiving entities or vehicles in range. Thus, in some cases, a large amount of sensor indications may be available to a receiving vehicle. In some examples, the sensor indication may be sent as a broadcast message because the establishment of a one-to-one communication with another vehicle may introduce a delay. It will however be appreciated that this is by way of example only. In some cases two neighbouring vehicles may travel a similar path for a period of time. Vehicles such as this with similar speeds and/or trajectories may establish a one to one communication based on their common or similar path.

In an embodiment, a processor of a vehicle or receiving entity may be configured to selectively process one or more indications of sensor data in dependence on characteristics of the sender of the indication. For example, the third vehicle 330 may selectively process an indication of sensor data from the first vehicle 310 and the second vehicle 320 and ignore indications of sensor data from the fourth 340, fifth 350 and sixth vehicles 360.

In examples, the characteristics of the sender used to determine whether to process indications of sensor data from that sender may be at least one of position, velocity and/or direction of travel of the sender. It will be appreciated that the position, velocity and direction of travel may be determined with respect to the receiving vehicle. In this example, for a vehicle, communication may be suppressed for oncoming vehicles, while being supported for vehicles, driving in the same direction.

FIG. 4 is a flow diagram showing the method steps associated with an example in which communication comprising indications of sensor data may be suppressed for at least some other vehicle or entities. A method in accordance with FIG. 4 may be carried out by a processor in a vehicle or entity.

At step 401, the processor may determine a positional characteristic of a sender of an indication of sensor data. The positional characteristic may be at least one of position, velocity and/or direction of travel of the sender. It will be appreciated that the position, velocity and/or direction of travel may be determined with respect to the position, velocity and/or direction of travel of the processor. In some examples, this determination may initially be carried out by receiving an initial sensor indication from the sender and using positional information contained therein to determine the position of the sender. For example, the processor may use one or more of GPS location data, speed and/or directional information contained in an initial indication of sensor information. In other examples, a receiving vehicle may make use of its own sensor systems to determine the positional characteristics of a sending vehicle. For example, the processor may make use of its radar, LIDAR and/or vision system to make a determination of a relative position of the sending vehicle. It will be appreciated that the processor may also make use of positional information of the receiving vehicle, for example location and/or speed data, to determine the positional characteristics of the sending vehicle.

At step 402, it is determined whether the indication of sensor data from the sender is relevant for the processor. This determination may be based on the determined positional characteristic. For example, the determination may be that the positional characteristic indicates that the sender has knowledge of an area or environment towards which the processor is moving. In a specific example, the determination may be to determine whether positional characteristics of the sender and of the processor or vehicle or entity in which the processor is implemented are similar. For example the respective positional characteristics may indicate that the sender and the processor are moving in the same direction and/or that the sender is further ahead in the direction of travel than the processor (upstream). For example the determination may compare location, direction and speed information for the sending and receiving vehicles. If it is determined that the two vehicles are travelling the same direction, for example along the same road then the indication of sensor information may be considered to be relevant. The processor may, for example, also compare speed information to determine whether the vehicles will be in proximity for a period of time, or for example, determine that the sender is a road side entity.

In some examples the relevance of the indication of sensor information, or the likelihood that a sending vehicle possesses relevant information may be ranked. In this example, processor may make its determination based on the ranking. This may be of use, for example in high traffic areas, where a plurality of vehicles may possess relevant information. The processor may then restrict the number or vehicle or entities from which indications of sensor data will be processes and this may allow the processor to determine which sending vehicles or entities possess more relevant information.

If it is determined that the indication of sensor data is relevant based on the positional characteristic of the sender, the method may progress to step 403 where the indication of sensor data is processed by the processor. If it is determined that the indication of sensor data is not relevant based on the positional characteristic of the sender, the method may progress to step 404 where the indication of sensor data is discarded or ignored. Subsequent indications from the same sender may also be ignored in some embodiments. In this case, in a further example, a sending vehicle may be marked as relevant and the determination 401 and 402 may not be subsequently carried out for a sending vehicle that has been determined to be relevant. A determination of positional characteristics and their relevant may be then carried out periodically.

In the foregoing, three types of indications of sensor data have been described, namely an attention byte, a compressed list of objects and raw sensor data. It will be appreciated that each of the types may differ in the amount of resources required to transmit and process that data. In systems comprising a large number of vehicles and/or entities, it may be useful to limit or alter the bandwidth required by such peer to peer communication. In a further embodiments, a processor, for example the processor 114 or 124 may be configured to determine whether the available bandwidth is sufficient for a certain type of indication of sensor data and, if not, select a type of sensor data that requires less bandwidth than the original type of indication of sensor data. In accordance with the above examples, it will be appreciated that raw sensor data may require the largest bandwidth, followed by a condensed list of objects, followed by an attention byte.

Figure 5:
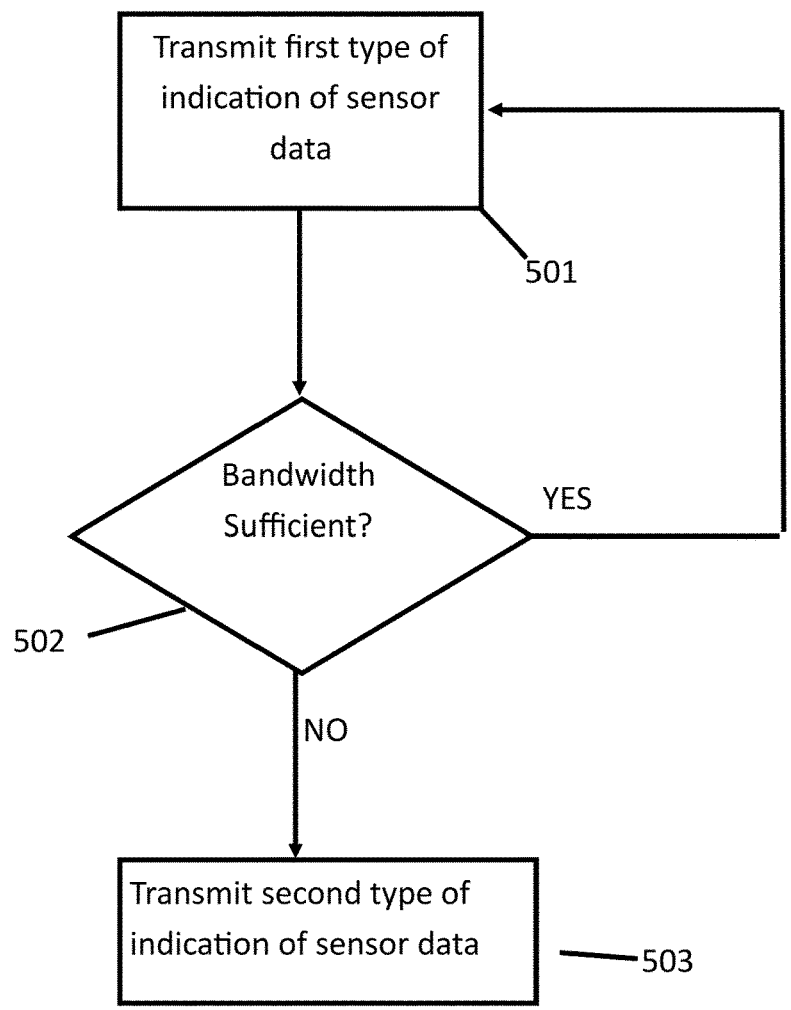
FIG. 5 is a flow diagram depicting method steps in accordance with a third embodiment.

FIG. 5 shows an example of such a system.

At step 501 of FIG. 5 an indication of sensor data is transmitted from a first entity to a second entity. The indication of sensor data may be a first type. In this example, the indication may be one of: raw sensor data and a list of detected objects. At step 502, it is determined whether there is sufficient bandwidth to transmit the first type of the indication of sensor data.

It will be appreciated that a determination of whether available bandwidth is sufficient for communication may be carried out in a variety of ways. In one example, a receiving entity or vehicle may carry out an error check or determination on the receiving indication of sensor data. For example, if received raw data or compressed object list is corrupt, it may be determined that the bandwidth is insufficient. In examples a determination of a corrupt indication of sensor data may be determining that the received indication of sensor data is mismatched to other data received or is incomplete.

In another example, the latency of the transmission of the indication of sensor data may be measured. For example, the vehicle or entity that received the indication of sensor data may respond with an acknowledgement byte. The sending vehicle may receive the acknowledgement byte and determine a latency between sending the indication of sensor data and receiving the acknowledgement byte. Alternatively, if no acknowledgment is received (in a system where the acknowledgement byte is activated) the sending vehicle may determine that the bandwidth is insufficient.

If there is sufficient bandwidth, the method proceeds back to 501 where indications of sensor data according to the first type are transmitted. If, at step 502, it is determined that there is not sufficient bandwidth, the method may proceed to step 503 where the type of indication of sensor data transmitted is changed to a type of indication of sensor data requiring less bandwidth. For example, if the first type of indication of sensor data is raw sensor data, this may be changed to a second type comprising one of a list of detected objects and an attention byte. If the first type of indication of sensor data is a list of detected objects, the second type of indication of sensor data may be an attention byte. As described, the determination of whether the bandwidth is sufficient may be carried out by the sending vehicle and/or the receiving vehicle. The vehicle that carries out the determination may provide an indication to the other vehicle that the type of indication is going to change.

It will be appreciated that this detection may additional work in terms of more bandwidth being available. For example, if it determined at step 502, that bandwidth is available for a type of indication of sensor data that requires more bandwidth than the first type, the processor may select a second type of indication of sensor data that requires more bandwidth than the first type. For example, if the first type was the attention byte, the processor may select a second type to be one of the list of detected objects and the raw data. If the first type was the list of detected objects, the processor may select the second type to be the raw sensor data.

In the example of FIG. 5, it has been described that the type of indication may be selected in dependence on the available bandwidth in the system. Similarly, a determination of which communication standard to use when transmitting an indication may be determined in dependence on the bandwidth available in those systems. For example a sending or receiving vehicle may switch from a first communication type to a second if it is determined that the bandwidth of the first communication type is insufficient and/or that more bandwidth is available for the second communication type. For example, a switch may be made between 802.11p to LTE and/or 5G, if bandwidth is insufficient.

In the foregoing the use of an indication of sensor data shared between vehicles or entities has been described and the processing of such data by a processor, for example processor 114 or 124. It will be appreciated that such processors may be implemented with sufficient processing capabilities to process the internal and external sensor data. Any processor with such capabilities may be used, for example a multiple layer processor with an appropriate software and/or hardware architecture may be implemented.

In the foregoing, the sharing of an indication of sensor information has been described. It will be appreciated that in some embodiments, additional data may be shared, for example GPS information and/or maps.

The invention claimed is:

1. An apparatus inside a first subsystem of a vehicle to vehicle network, the vehicle to vehicle network including the first subsystem and a second subsystem, the first subsystem including a first sensor system and the second subsystem including a second sensor system, the apparatus comprising:
   a processor configured to receive first sensor data from the first sensor system; and
   a receiver configured to:
      receive second sensor data from the second sensor system over a communication network; and
      provide the second sensor data to the processor, wherein the second sensor data comprises a first type of sensor data having a first bandwidth requirement and a second type of sensor data having a second bandwidth requirement, wherein the second bandwidth requirement is less than the first bandwidth requirement;
   wherein the processor is further configured to:
   determine an available bandwidth of the communication system;
   when the first bandwidth requirement exceeds the available bandwidth, select the second type of sensor data; and
   process the first and second sensor data to at least partially determine a presence of an object surrounding the first subsystem.

2. The apparatus of claim 1, wherein the second sensor data corresponds to sensor data of a sensory system of the second subsystem.

3. The apparatus of claim 1, wherein the processor is further configured to carry out an error check on the received second sensor data.

4. The apparatus of claim 3, wherein the determination of the available bandwidth is carried out in dependence on the outcome of the error check.

5. The apparatus of claim 1, wherein the processor is further configured to compare the received second sensor data to the first sensor data.

6. The apparatus of claim 5, wherein the determination of the available bandwidth is carried out in dependence on the comparison of the first and second sensor data.

7. The apparatus of claim 1, wherein the apparatus is further configured to transmit an acknowledgment to the second subsystem in response to receiving the second sensor data.

8. The apparatus of claim 7, wherein the apparatus is configured to receive an indication of a selection of a type of sensor data from the second subsystem.

9. A method comprising:
   receiving first sensor data from a sensor system of a first subsystem in a vehicle to vehicle network;
   receiving second sensor data from a sensor system of a second subsystem in the vehicle to vehicle network over a communication network, wherein the second sensor data comprises a first type of sensor data having a first bandwidth requirement and a second type of sensor data having a second bandwidth requirement, wherein the second bandwidth requirement is less than the first bandwidth requirement;
   determining an available bandwidth of the communication system;
   when the first bandwidth requirement exceeds the available bandwidth, select the second type of sensor data; and
   processing the first and second sensor data and the second sensor data to at least partially determine a presence of an object an surrounding the first subsystem.

10. The method of claim 9, wherein the second sensor data corresponds to sensor data of a sensory system of the second subsystem.

11. The method of claim 9, further comprising:
   carrying out an error check on the received second sensor data.

12. The method of claim 11, wherein determining the available bandwidth is carried out in dependence on the outcome of the error check.

13. The method of claim 9, further comprising:
   comparing the received second sensor data to the first sensor data.

14. The method of claim 13, wherein determining the available bandwidth is carried out in dependence on the comparison of the first and second sensor data.

15. The method of claim 9, further comprising:
   transmitting an acknowledgment to the second subsystem in response to receiving the second sensor data.

* * * * *